United States Patent [19]
Johnson

[11] Patent Number: 5,612,841
[45] Date of Patent: Mar. 18, 1997

[54] FLEXURE ASSEMBLY FOR HARD DISC DRIVE HEADS

[75] Inventor: Lyle G. Johnson, Waverly, Minn.

[73] Assignee: Seagate Technology, Inc., Scotts Valley, Calif.

[21] Appl. No.: 390,894

[22] Filed: Feb. 15, 1995

Related U.S. Application Data

[63] Continuation of Ser. No. 77,183, Jun. 15, 1993, abandoned.

[51] Int. Cl.⁶ ........................................................ G11B 5/48
[52] U.S. Cl. ......................................................... 360/104
[58] Field of Search .................................. 360/104, 103, 360/105, 106, 107

[56] References Cited

U.S. PATENT DOCUMENTS

| | | | |
|---|---|---|---|
| 5,021,907 | 6/1991 | Zak | 360/104 |
| 5,201,458 | 4/1993 | Hagen | 360/104 |
| 5,237,475 | 8/1993 | Kazama et al. | 360/103 |
| 5,282,103 | 1/1994 | Hatch et al. | 360/103 |
| 5,353,181 | 10/1994 | Frater et al. | 360/104 |
| 5,442,504 | 8/1995 | Nagase et al. | 360/104 |

FOREIGN PATENT DOCUMENTS

| | | | |
|---|---|---|---|
| 60-246015 | 12/1985 | Japan | 360/103 |

*Primary Examiner*—Stuart S. Levy
*Assistant Examiner*—Allen Cao
*Attorney, Agent, or Firm*—Edward P. Heller, III

[57] ABSTRACT

A flexure assembly for mounting and supporting a read/write head in a rigid disc drive data storage device. The flexure assembly includes a main flexure member which has a rigid beam and a gimbal portion integrally formed using the processes of etching and half-etching. A load transfer extension is fixedly attached to the rigid beam of the main flexure member, and is used to transfer a balancing force to counteract the self-acting hydrodynamic air bearing which is an integral part of the head. Application of the balancing force is through a load point button formed using the half-etching process on the tab used to adhesively mount the head. Attachment of the load transfer extension to the rigid beam is accomplished using either adhesives, or, preferably, an arrangement of tabs which are bent into cooperative arrangement with alignment features, thus eliminating the need to weld a separate gimbal member to a flexure load beam.

9 Claims, 5 Drawing Sheets

FLEXURE ASSEMBLY FOR HARD DISC DRIVE HEADS

This is a continuation of application Ser. No. 08/077,183 filed on Jun. 15, 1993, now abandoned.

BACKGROUND OF THE INVENTION

1. Field of the Invention

This invention relates generally to the field of disc drive data storage devices and more particularly, but not by way of limitation, to a flexure assembly for supporting the heads used to access data on the disc surfaces.

2. Brief Description of the Prior Art

Disc drive data storage devices of the type known as "Winchester" disc drives are well known in the art. In such disc drives, one or more rigid discs coated with a magnetizable recording medium are mounted to a spindle motor for rotation at a constant high speed, and data are recorded on the disc surface in a plurality of circular, concentric tracks.

The recording and retrieval of data—also referred to as writing and reading, respectively—are accomplished using an array of read/write heads, typically one per disc surface, mounted to an actuator which moves the heads simultaneously across the disc surfaces to any desired track. The most common type of actuator in current use is the rotary voice coil actuator, which includes a voice coil motor coupled to an actuator body which is adapted to pivot about a shaft which is parallel to the spin axis of the spindle motor. The side of the actuator body opposite the voice coil motor comprises a plurality of head mounting arms, to which are mounted the flexure assemblies that support the heads in cooperative arrangement with the discs.

In disc drives of this type, the heads themselves are made up of a transducer—which accomplishes the actual read and write functions—carried in a slider body, which serves to carry the transducer and forms a self-acting hydrodynamic air bearing surface to "fly" the transducer in close proximity to the surface of the disc on a thin layer of air dragged along by the rapid spinning of the discs.

The function of the flexure assembly, which attaches the head to the actuator body for controlled movement to the tracks on the disc, is to provide a "down" force to counteract the tendency of the slider to fly upward on the air bearing, and to allow a small amount of compliance in the roll and pitch axes of the head—to compensate for minor variations in the disc surface—while maintaining a stiff support for the head in the yaw and "in-plane" axes.

Flexure assemblies of the prior art consist of four functional portions:

1) a mounting section, to attach the flexure with its associated head to the actuator;

2) a flexible beam section, which applies a spring force toward the disc surface to counter the tendency of the head to rise away from the disc on its air bearing surfaces;

3) a rigid beam section, which transfers the downward force of the flexible beam section to the head, and;

4) a gimbal portion, which mounts the head and allows for the minor pitch and roll variations mentioned above.

The present invention relates primarily to a new rigid beam/gimbal combination, and, as such, the mounting and flexible beam portions of the flexure will not be discussed herein in any great detail.

In flexure assemblies from the prior art, the rigid beam section of the flexure is typically in the form of an elongated isosceles triangle with its base connected to the flexible beam portion of the flexure. The sides of the rigid beam are commonly formed out-of-plane from the main portion of the rigid beam to impart additional stiffness to the rigid beam. In such flexures, the gimbal section is typically formed of thinner material and welded to the rigid beam. This welding—frequently accomplished using lasers—results in undesirable residual stresses in the materials of the rigid beam and gimbal.

The gimbal portion of prior art flexures is typically photo-etched from 0.002 inch stainless steel stock, and includes a mounting end welded to the rigid beam as described above, and a gimbal end lying at the distal end of the rigid beam. The gimballing action is created by through-etching the gimbal to form a pair of gimbal arms at the outer edges of the gimbal and extending in parallel with the longitudinal axis of the rigid beam. The distal ends of the gimbal arms are connected by a cross member, and a "tongue", to which the slider/head assembly is adhesively attached, extends from this cross member back toward the rigid beam. The tongue is usually formed slightly out-of-plane from the remainder of the gimbal in the direction of the head, and a spherical dimple is stamped in the tongue extending away from the head. The height of this dimple is substantially the same as the out-of-plane displacement of the tongue.

When the rigid beam and gimbal are welded together, the distal end of the rigid beam contacts the top of the dimple at a single point, allowing the flexibility of the gimbal arms to provide the desired roll and pitch compliance in the attitude of the head.

This type of flexure assembly has several drawbacks:

1) as mentioned above, the welding of the rigid beam to the gimbal introduces undesirable stresses in the materials of both components local to the welds, which can cause unacceptable variations in the mechanical behavior of the assembly;

2) accurate alignment of the rigid beam and gimbal during the welding process requires expensive precision fixtures;

3) stamp-forming of the tongue displacement and dimple in the gimbal introduce material stresses in the fragile gimbal;

4) any desired changes in the location of the dimple require expensive non cost effective tooling changes, and;

5) difficulty in determining exact dimple location.

It would, therefore, be desirable to create a flexure assembly which does not require welding of components or stamp-forming of features.

SUMMARY OF THE INVENTION

The present invention is a flexure assembly for mounting the heads in a rigid disc drive data storage device which includes gimbal arms, a cross member, tongue and load point features formed integrally with the rigid beam through the processes of through-etching and half-etching. A load transfer extension is connected to the rigid beam using either adhesive or, in a presently preferred embodiment, an arrangement of openings and cooperating folded tabs. When assembled, the load transfer extension contacts the load point feature and applies a "down force" to counteract the tendency of the head to fly away from the surface of the spinning disc.

It is an object of the present invention to provide a flexure assembly for mounting the heads in a disc drive data storage device, the assembly of which requires no welding of components.

It is another object of the present invention to provide a flexure assembly for a disc drive data storage device in which no stamp-forming of features is required.

It is another object of the present invention to provide a flexure assembly for a disc drive data storage device which is simple to fabricate and assemble in a high-volume production environment.

It is another object of the present invention to provide a flexure assembly for a disc drive data storage device in which desired changes in various features can be simply and inexpensively accomplished.

These and other objects, features and benefits of the present invention can be best understood by a study of the following detailed description of the invention, when read in conjunction with the accompanying drawings.

DETAILED DESCRIPTION OF THE INVENTION

Figure 1:
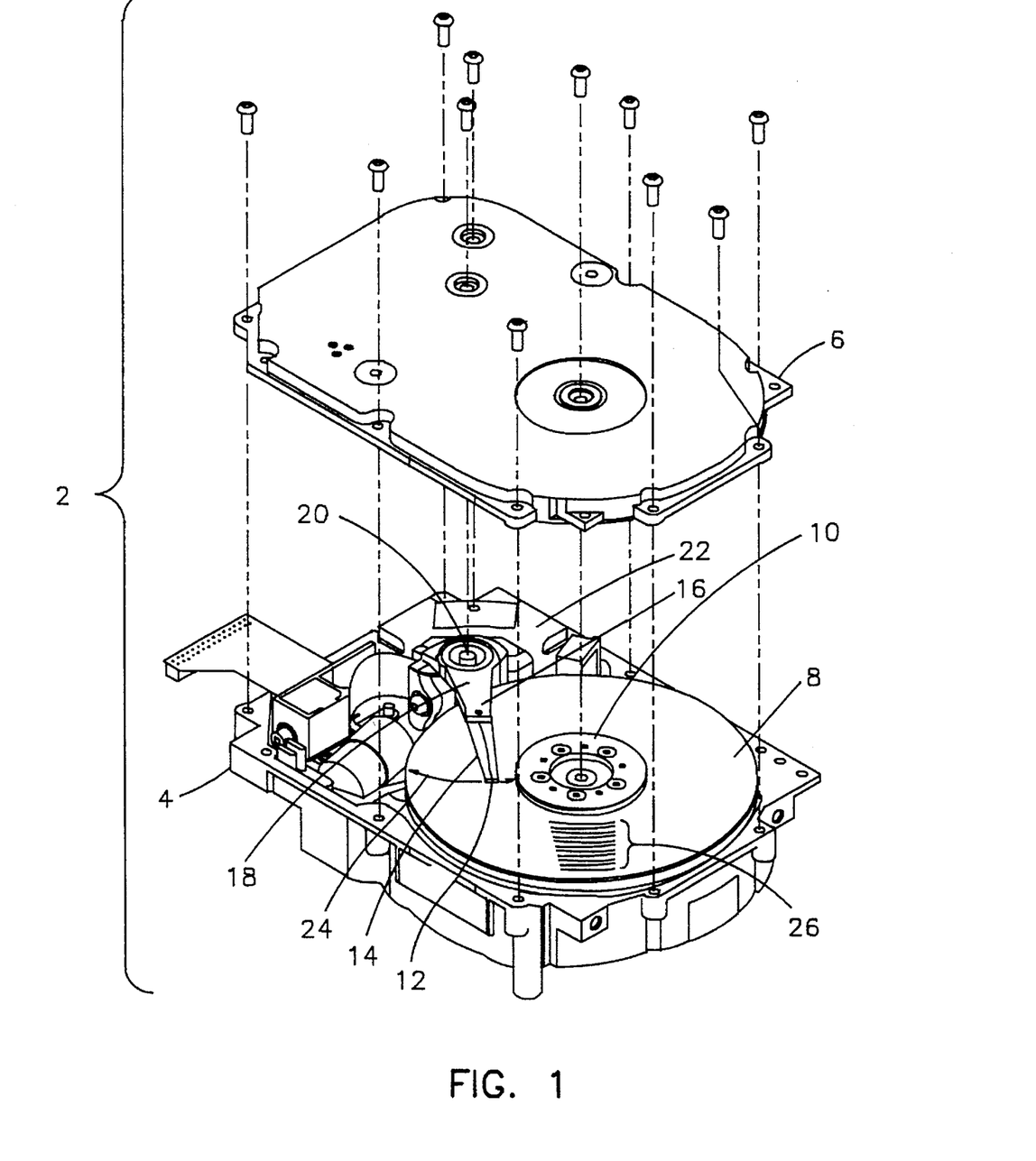
FIG. 1 is a plan view in partial cutaway of a disc drive data storage device in which the present invention is particularly useful.

Turning now to the drawings, and more specifically to FIG. 1, shown is a plan view of a disc drive data storage device 2—or disc drive—of the type in which the present invention is particularly useful. The disc drive 2 includes a housing base 4 and a top cover 6 which act cooperatively to form a sealed housing to protect internal components from external contaminants. One or more rigid discs 8 are mounted for rotation on a spindle motor, shown generally at 10. An arrangement of heads, one of which is designated 12, cooperates with the discs 8 to record—or write—and retrieve—or read—data. These heads 12 are mounted via flexure assemblies 14 to head mounting arms 16 attached to an actuator body 18. The actuator body 18 is adapted for rotation about a pivot shaft 20 under control of an actuator motor, shown generally at 22. The actuator motor 22 operates under control of electronic circuitry (not shown) to move the heads 12 along arcuate path 24 to any desired one of a plurality of circular, concentric tracks 26 on the discs 8.

It should be recalled that heads 12 are associated with both surfaces of the discs 8. For purposes of the ensuing discussion, terms such as "up", "upper", "upward" and "top" indicate the direction or component surface away from the disc surface, and complementary terms—such as "down", "lower", "downward" and "bottom"—refer to the direction or component surfaces toward the disc surface.

In disc drives of this type, the heads 12 include a self-acting hydrodynamic air bearing surface (not designated) which cooperates with a thin layer of air dragged along by the spinning discs 8 to fly the heads above the disc surfaces. The flexures 14 provide a downward force to balance the lifting tendency of the heads and closely control the separation between the heads 12 and discs 8. The flexures 14 include a gimbal portion (not designated) which allows compliance in the roll and pitch axes of the heads 12, while maintaining stiffness in the yaw and in-plane axes to permit accurate positioning of the heads 12 relative to the tracks 26. This compliance allows the heads 12 to closely follow the disc surfaces in spite of minor variations the surfaces of the discs 8.

Figure 2:
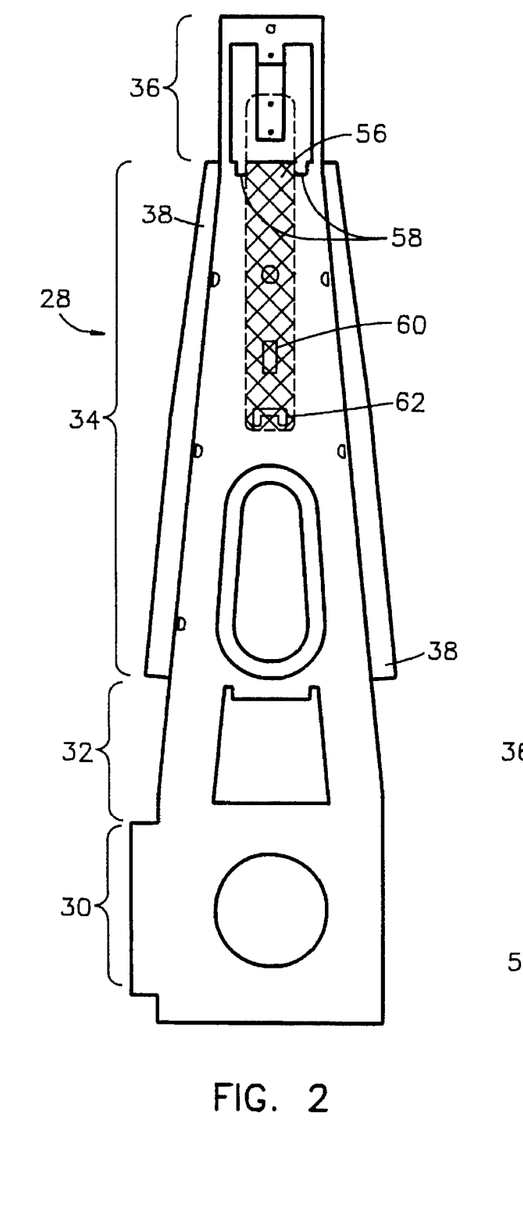
FIG. 2 is a plan view of the main flexure member which forms a part of the present invention.

FIG. 2 is a plan view of the main flexure member 28 which forms a part of the flexure assembly 14 of the present invention. The main flexure member 28 is formed of 0.0025 inch thick stainless steel material, and the overall shape as well as specific features are formed using the processes of through-etching and half-etching.

The main flexure member 28 consists of four distinct portions:

1) a mounting portion 30, used to attach the flexure to the head mounting arms (16 in FIG. 1) of the actuator;

2) a flexible beam portion 32, which is formed to supply the downward force to determine the flying height of the head;

3) a rigid beam 34 for transferring the downward force of the flexible beam portion 32, and;

4) a gimbal section 36, for mounting the head and allowing the desired roll and pitch compliance for the head.

Various embodiments of the mounting portion 30 and flexible beam portion 32 are know in the industry. One such embodiment of the mounting portion 30 has been described in co-pending U.S. patent application Ser. No. 07/977,944, Attorney's docket SEA 8188, and one possible configuration of the flexible beam portion 32 has been described in U.S. Pat. No. 5,065,268, both assigned to the assignee of the present invention. Since the present invention does not concern these portions of the flexure assembly and is usable with a variety of embodiments of these sections of the flexure, there will be no further discussion of the mounting portion 30 or flexible beam portion 32 of the flexure herein. Instead, discussion will focus on the rigid beam 34 and gimbal section 36 of the flexure.

As is well known in the industry, through-etching is accomplished using matching patterns of masks on both sides of the material. When the material thus masked is exposed to the etchant, exposed material is etched from both surfaces until it is completely etched away. In the half-etching process, by contrast, the masking patterns on opposed sides of the material to be half-etched do not match. That is, one side of the material in the area to be half-etched is covered by the mask, while the other side of the material is exposed to the etchant. By this method, material is removed from only one side of the material. Control of the etchant strength and exposure time allows the thickness of material in these half-etched areas to be selectively reduced to a desired thickness. In practice, it has been found that it is fairly simple to reduce material thickness by approximately 40% in areas of unmatching masking, while simultaneously through-etching those areas where the masking is identical on both sides of the material.

The rigid beam 34 of the flexure of the present invention is in the general shape of an elongated isosceles triangle, with its base connected to the flexible beam portion 32 of the main flexure member 28. Along the sides of the rigid beam 34, the material is bent to form channels 38, which act as stiffening elements to maintain the rigidity of the rigid beam 34, and are frequently used to guide the wires (not shown) used to pass read and write electrical signals to and from the head (also not shown).

Figure 3:
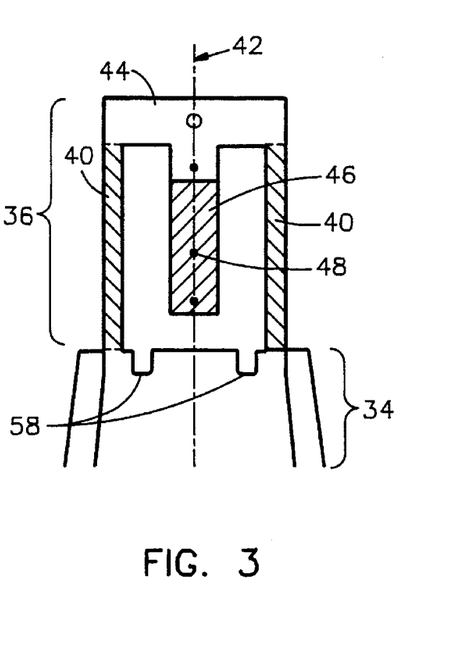
FIG. 3 is a detailed plan view of the gimbal section of the main flexure member of FIG. 2.

The details and features of the gimbal section 36 can best be seen in FIG. 3 which is a detail view of the gimbal section 36 of the main flexure member 28.

In FIG. 3, the gimbal section 36 can be seen to include a pair of gimbal arms 40 which extend in parallel with the longitudinal centerline 42 of the rigid beam 34. The gimbal arms 40 are connected at their first ends to the rigid beam 34, and are connected at their second ends by a cross-member 44. Extending from the cross-member 44 back along the longitudinal centerline 42 toward the rigid beam 34 is a head mounting tab 46. Since this is a top plan view, the head (not shown) would be adhesively mounted to the far side of the head mounting tab 46 as viewed.

The gimbal arms 40 and head mounting tab 46 are half-etched on opposite sides of the material, as shown by the shading in the figure. Specifically, those areas half-etched from the near side are shaded from lower left to upper right, while those areas half-etched from the far side are shaded lower right to upper left. This means that, after etching, the lower surface of the gimbal arms 40 will be approximately coplanar with the upper surface of the head mounting tab 46.

A load point button 48 is shown approximately centered in the head mounting tab 46. This load point button 48 is formed by masking a desired location prior to etching, thus leaving the load point button 48 as an isolated unetched area of full material thickness. In practice, it has been found that it is possible to create a load point button 48 approximately 0.002 inches in diameter using this method. When the flexure of the present invention is assembled, the entire down force generated by the flexible beam portion (32 in FIG. 2) will be applied to the head through the load point button 48, and the roll and pitch gimballing of the head will occur about the load point button 48, as will be explained below.

In practice—since the location of the load point button 48 significantly impacts the flying attitude of the head—it may be desirable to move the location of the load point button 48 either along the longitudinal centerline 42 or laterally off the centerline 42. With prior art dimples, stamp-formed in the tongue of the gimbal as described above, such changes would require expensive changes to the tooling used to form the dimple. With the gimbal of the present invention, however, the location of the load point button 48 can be easily changed by simply modifying the artwork used to generate the masking on the material, which is a much less expensive and labor-intensive task.

Figure 4:
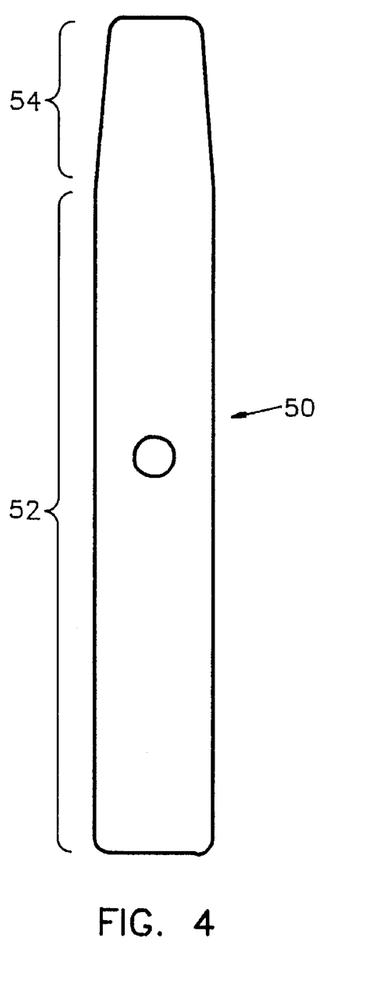
FIG. 4 is a plan view of a first embodiment of the load transfer extension which forms a part of the present invention.

FIG. 4 is a plan view of a first embodiment of a load transfer extension 50 which forms a part of the present invention. The load transfer extension 50 includes an attachment portion 52 and a contact surface 54. In this embodiment, the attachment portion 52 is intended to be adhesively attached to the rigid beam (34 in FIG. 2) in the area shown by the dotted line in FIG. 2 by applying an appropriate adhesive in the cross-hatched area 56. When the load transfer extension 50 is joined to the rigid beam 34, the contact surface 54 extends beyond the end of the rigid beam 34 of the flexure 28 and over the load point button (48 in FIG. 3). Since the bottom surface of the load transfer extension 50 is substantially co-planar with the top of the load point button 48, the downward force generated by the flexible beam portion 32 of the flexure 28 will be applied through the rigid beam 34 and attached load transfer extension 50, to the load point button 48, and thence through the head mounting tab 46 to the head (not shown).

While the use of an adhesive to attach the load transfer extension 50 to the rigid beam 34 alleviates the previously discussed problem of introducing undesirable material stresses caused by laser welding, his approach does include certain other drawbacks:

1) in order to align the two components for accurate attachment, precision tooling is needed, and development and manufacturing of this tooling is expensive and time consuming;

2) the use of adhesives in high volume production environments leads to leakage of the adhesive onto the tooling fixtures used to align the components being glued, causing a high incidence of rework and frequent cleaning of the fixtures, and;

3) most adhesives suitable for this type of application require a certain fixed "cure time", which either slows volume production or leads to an excessive amount of work in progress.

Therefore, a second, and preferred, scheme for attaching the load transfer extension 50 to the rigid beam 34 has been developed. This preferred embodiment consists of an arrangement of precisely located reference feature s and a complementary arrangement of folding tabs.

Returning now to FIG. 2, it can be seen that the rigid beam 34 of the flexure of the present invention includes a pair of end alignment feature s 58 closely adjacent the gimbal section 36. These end alignment feature s 58 are symmetrically disposed on either side of the longitudinal centerline 42 of the rigid beam 34. A lateral alignment feature 60 is located near the longitudinal centerline 42, and a holding tab 62 is also included. The function of these features will be discussed in detail below.

Figure 5:
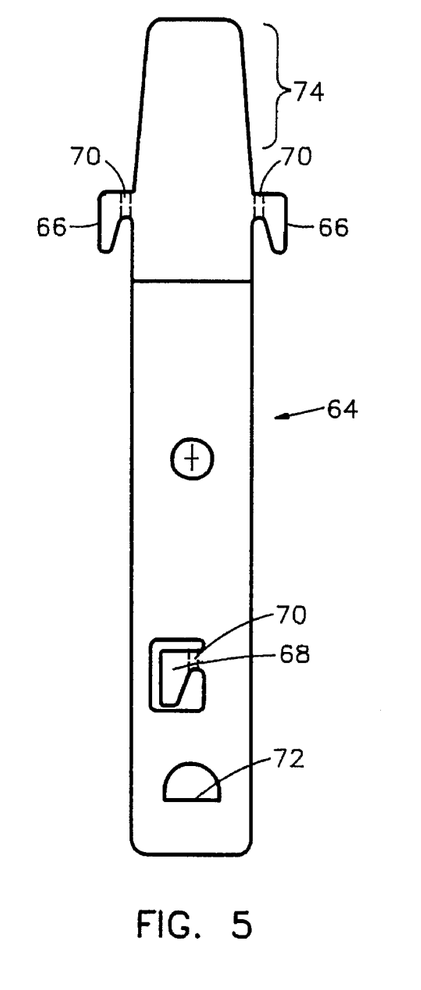
FIG. 5 is a plan view of a presently preferred embodiment of the load transfer extension which forms a part of the present invention.

FIG. 5 is a plan view of a load transfer extension 64 which forms a part of the preferred embodiment of the flexure assembly of the present invention. While the load transfer extension 64 is intended to be formed before attachment to the main flexure member (28 in FIG. 2) as will be discussed below, in FIG. 5, the load transfer extension 64 is shown in its unformed condition. The load transfer extension 64 includes a pair of end alignment tabs 66 whose relative positions are selected for cooperative engagement with the end alignment features (58 in FIG. 2) in the main flexure member. A lateral alignment tab 68 is positioned relative to the end alignment tabs 66 for cooperative engagement with the lateral alignment feature (60 in FIG. 2) in the main flexure member.

The end alignment tabs 66 and lateral alignment tab 68 are intended to be bent into engagement with corresponding features on the main flexure member (28 in FIG. 2). To facilitate this bending and aid in controlling the location of the bends, each of the tabs includes a half-etched area 70. The function and location of these half-etched areas 70 can perhaps best be seen in FIGS. 6A and 6B.

Figure 6A:
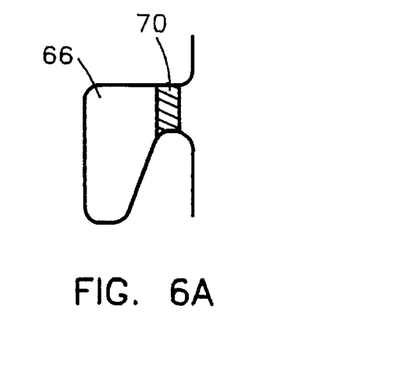
FIGS. 6A and 6B are detail plan and sectional views, respectively, of certain features of the load transfer extension of FIG. 5.
Figure 6B:
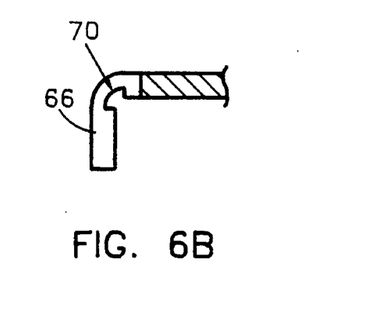

FIGS. 6A and 6B are detail plan and sectional views, respectively, of one of the end alignment tabs 66. The plan view of FIG. 6A shows the end alignment tab 66 in its unformed condition, while the sectional view of FIG. 6B shows the end alignment tab 66 in its formed condition, prior to the mounting of the load transfer extension (64 in FIG. 5) to the main flexure member (28 in FIG. 2). In FIG. 6A, it can be seen that the half-etched area 70 lies across the base of the end alignment tab 66 and is on the side of the tab toward which the tab will be bent. As can be seen in FIG. 6B, this results in the bend forming in the half-etched area 70 when the bending force is applied to the tab 66.

Returning now to FIG. 5, a reference feature 72 is also formed in the load transfer extension 64. This reference feature 72 is intended to engage with the holding tab (62 in FIG. 2) when the load transfer extension 64 is attached to the main flexure member (28 in FIG. 2).

Assembly of the load transfer extension 64 to the main flexure member is accomplished by the following steps:

1) the formed load transfer extension 64 is inserted into the main flexure member 28 with the end alignment tabs 66 engaging the end alignment features 58 and the lateral alignment tab 68 engaging the lateral alignment feature 60;

2) the end alignment tabs 66 and lateral alignment tab 68 are optionally further bent to fully engage the main flexure member, and;

3) the holding tab 62 is bent upward to engage the reference feature 72 and ensure that the end alignment tabs 66 are firmly seated against the end alignment features 58.

When this assembly is completed, the lower surface of the load transfer extension 64 is coplanar with the upper surface of the main flexure member 28, and a contact surface 74 on the load point extension 64 contacts the top of the load point button (48 in FIG. 3).

Figure 7:
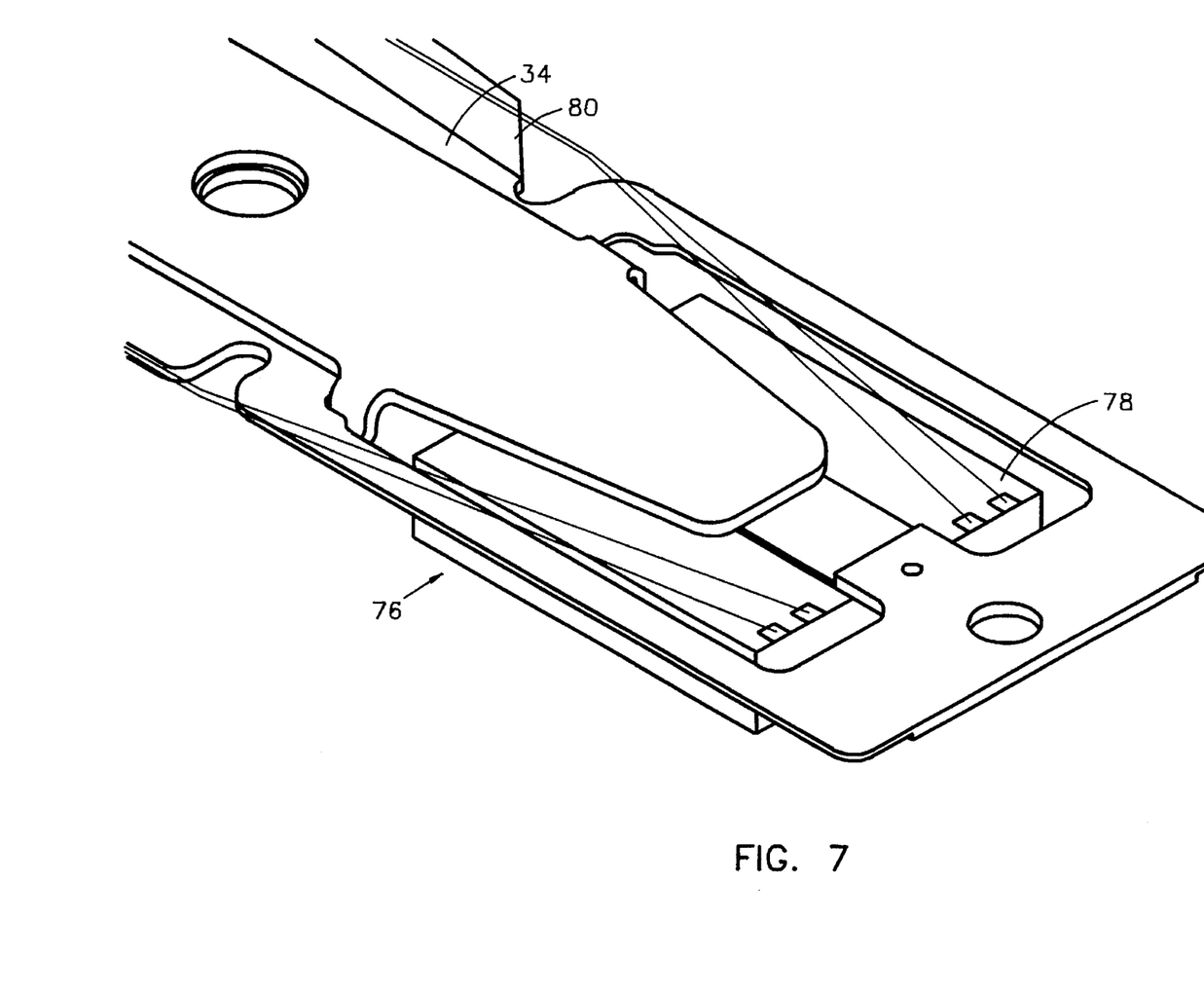
FIG. 7 is a perspective view of an assembled flexure and head assembly made in accordance with the present invention.

FIG. 7 is a partial perspective drawing of a completely assembled flexure/head assembly 76, showing the head slider assembly 78 mounted to the flexure (not separately designated). An array of wires—the specific number of which is dependent upon the type of head—used to carry the electronic signals for writing and reading data is lead from the head 78 down one of the channels 80 formed in the sides of the rigid beam portion 34 of the flexure.

Figure 8:
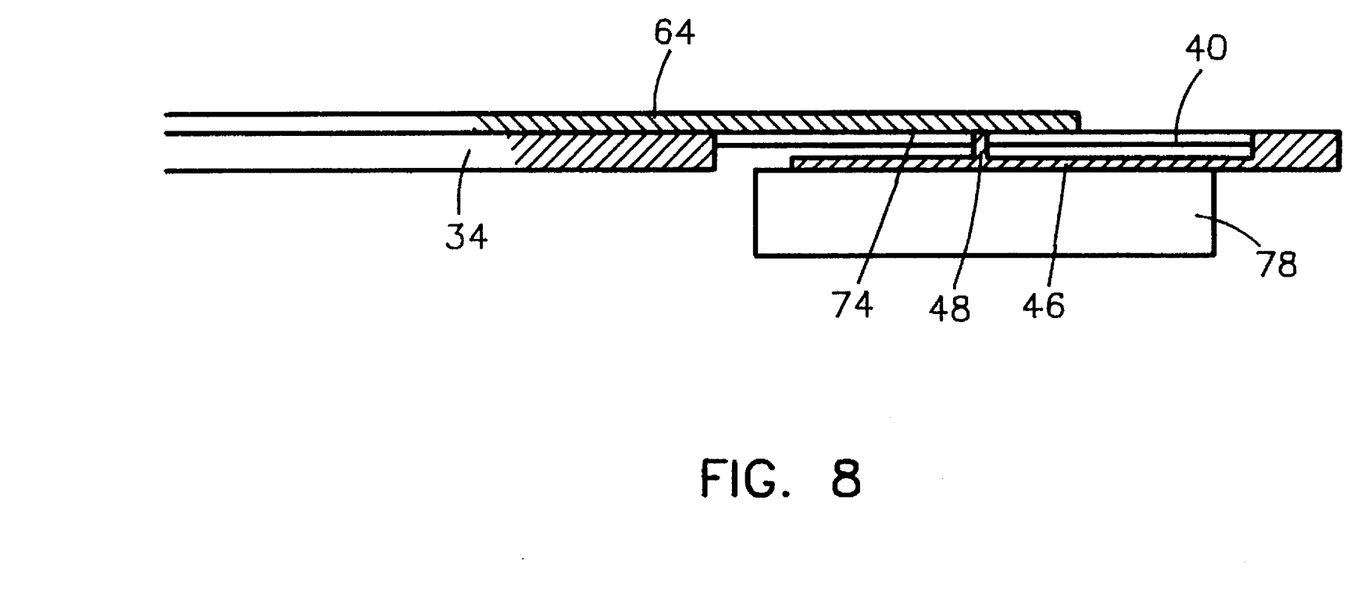
FIG. 8 is a sectional view of the gimbal portion of a complete flexure/head assembly made in accordance with the present invention.

The relationship between the various components can be best seen in FIG. 8, which is a partial sectional view of the flexure/head assembly of FIG. 7 taken along the longitudinal centerline of the assembly. The vertical scale in the figure has been greatly exaggerated to enhance clarity. As can be seen in the figure, the head/slider assembly 78 is adhesively mounted to the lower surface of the head mounting tab 46. The load point button 48, which is an integral part of the head mounting tab 46, contacts the contact surface 74 of the load transfer extension 64, and the lower surface of the load transfer extension 64 is coplanar with the upper surface of the rigid beam 34. It should be noted that with this arrangement, the roll and pitch gimballing action takes place about the top of the load point button 48 which is substantially in the same horizontal plane as the flexible gimbal arms 40. The point atop the load point button 48 upon which the downward force of the flexure is exerted is vertically displaced from the upper surface of the head slider assembly 78 by only the thickness of the gimbal material. With such an arrangement, any slight variations in the flatness of the disc surface will be compensated for by minor deflection of the gimbal arms 40, which allow roll and pitch movement of the head slider assembly 78 about the top of the load point button 48.

It is evident that the present invention is well adapted to achieve the objects stated as well as those inherent therein. While a specific embodiment has been disclosed, modifications to the invention which fall within the scope and spirit of the invention may become apparent to one skilled in the art after reading this disclosure. Therefore the scope of the invention is to be limited only by the accompanying claims.

What is claimed is:

1. A flexure assembly for mounting a head to an actuator in a disc drive data storage device, the flexure assembly comprising:

a main flexure member, formed of a single continuous piece of material having a first material thickness, the main flexure member comprising:

mounting means for connecting the flexure assembly to the actuator, flexible beam means for exerting a balancing force to determine flying height of the head, a rigid beam for carrying the balancing force to the head, gimbal means for allowing roll and pitch compliance in flying attitude of the head, the gimbal means comprising:

a pair of gimbal arms having a second material thickness less than the first material thickness, the gimbal arms laterally displaced from and extending parallel to a longitudinal axis of the rigid beam, the gimbal arms having first and second ends, the first ends being integral to the rigid beam, a cross-member integral to and connecting the second ends of the gimbal arms, and a head mounting tab integral to and projecting from the cross-member along the longitudinal axis toward the rigid beam, the head mounting tab having a load point button and a thickness which is less than the first material thickness and substantially equal to the second material thickness except at the location of the load point button, which retains the first material thickness, a load transfer extension fabricated as a separate piece of material from the main flexure member and comprising:

a mounting portion for attachment of the load transfer extension to the rigid beam, and a contact surface which extends beyond the rigid beam and contacts a top of the load point button, and attachment means for attaching the load transfer extension to the rigid beam.

2. A flexure assembly as claimed in claim 1 wherein the attachment means is an adhesive.

3. A flexure assembly as claimed in claim 1 wherein the attachment means comprises a plurality of alignment surfaces on the rigid beam and a complementary plurality of alignment tabs on the load transfer extension, and a reference surface on the load transfer extension and a locking tab on the rigid beam, the alignment tabs and the locking tab engaging the alignment surfaces and the reference surface, respectively, thus attaching the load transfer extension to the rigid beam while fixedly locating the load transfer extension relative to the rigid beam.

4. A head and flexure assembly for a rigid disc drive data storage device, the head and flexure assembly comprising:

a head assembly, including a transducer for writing and reading data on surfaces of discs, and a flexure assembly comprising:
  a main flexure member, formed of a single continuous piece of material having a first material thickness, the main flexure member comprising:
    mounting means for connecting the flexure assembly to an actuator,
    flexible beam means for exerting a balancing force to determine flying height of the head,
    a rigid beam for carrying the balancing force to a head,
    gimbal means for allowing roll and pitch compliance in flying attitude of the head, the gimbal means comprising:
      a pair of gimbal arms having a second material thickness less than the first material thickness, the gimbal arms laterally displaced from and extending parallel to a longitudinal axis of the rigid beam, the gimbal arms having first and second ends, the first ends being integral to the rigid beam,
      a cross-member integral to and connecting the second ends of the gimbal arms, and
      a head mounting tab integral to and projecting from the cross-member along the longitudinal axis toward the rigid beam,
        the head mounting tab having a load point button and a thickness which is less than the first material thickness and substantially equal to the second material thickness except at the location of the load point button, which retains the first material thickness,
  a load transfer extension fabricated as a separate piece of material from the main flexure member and comprising:
    a mounting portion for attachment of the load transfer extension to the rigid beam, and
    a contact surface which extends beyond the rigid beam and contacts a top of the load point button, and
    attachment means for attaching the load transfer extension to the rigid beam.

5. A head and flexure assembly as claimed in claim 4 wherein the attachment means is an adhesive.

6. A head and flexure assembly as claimed in claim 4 wherein the attachment means comprises
  a plurality of alignment surfaces on the rigid beam and a complementary plurality of alignment tabs on the load transfer extension, and
  a reference surface on the load transfer extension and a locking tab on the rigid beam,
  the alignment tabs and the locking tab engaging the alignment surfaces and the reference surface, respectively, thus attaching the load transfer extension to the rigid beam while fixedly locating the load transfer extension relative to the rigid beam.

7. A disc drive data storage device including at least one head and flexure assembly, the head and flexure assembly comprising:
  a head assembly, including a transducer for writing and reading data on surfaces of discs, and
  a flexure assembly comprising:
    a main flexure member, formed of a single continuous piece of material having a first material thickness, the main flexure member comprising:
      mounting means for connecting the flexure assembly to an actuator,
      flexible beam means for exerting a balancing force to determine flying height of a head,
      a rigid beam for carrying the balancing force to the head,
      gimbal means for allowing roll and pitch compliance in flying attitude of the head, the gimbal means comprising:
        a pair of gimbal arms having a second material thickness less than the first material thickness, the gimbal laterally displaced from the extending parallel to a longitudinal axis of the rigid beam, the gimbal arms having first and second ends, the first ends being integral to the rigid beam,
        a cross-member integral to and connecting the second ends of the gimbal arms, and
        a head mounting tab integral to and projecting from the cross-member along the longitudinal axis toward the rigid beam,
          the head mounting tab having a load point button and a thickness which is less than the first material thickness and substantially equal to the second material thickness except at the location of the load point button, which retains the first material thickness,
    a load transfer extension fabricated as a separate piece of material from the main flexure member and comprising:
      a mounting portion for attachment of the load transfer extension to the rigid beam, and
      a contact surface which extends beyond the rigid beam and contacts a top of the load point button, and
      attachment means for attaching the load transfer extension to the rigid beam.

8. A disc drive data storage device as claimed in claim 7 wherein the attachment means is an adhesive.

9. A disc drive data storage device as claimed in claim 7 wherein the attachment means comprises
  a plurality of alignment surfaces on the rigid beam and a complementary plurality of alignment tabs on the load transfer extension, and
  a reference surface on the load transfer extension and a locking tab on the rigid beam,
  the alignment tabs and the locking tab engaging the alignment surfaces and the reference surface, respectively, thus attaching the load transfer extension to the rigid beam while fixedly locating the load transfer extension relative to the rigid beam.

* * * * *